April 24, 1956
R. V. ANDERSON
2,742,765
AIR CONDITIONING SYSTEM FOR AUTOMOBILES
Filed Sept. 30, 1953
2 Sheets-Sheet 1
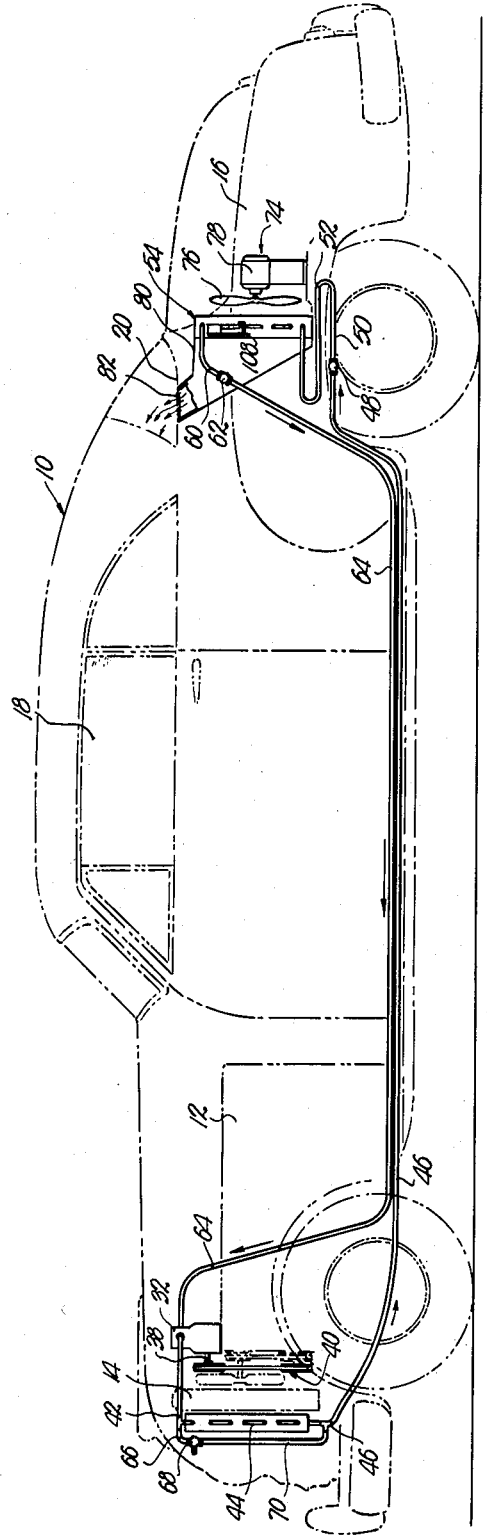
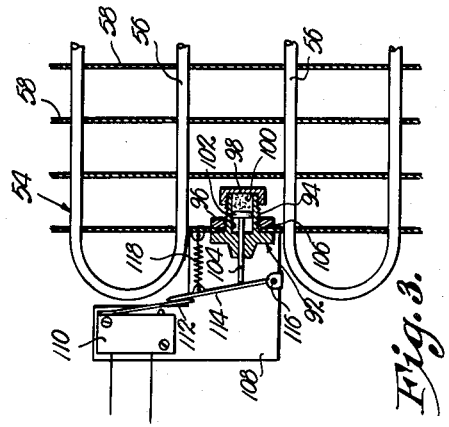
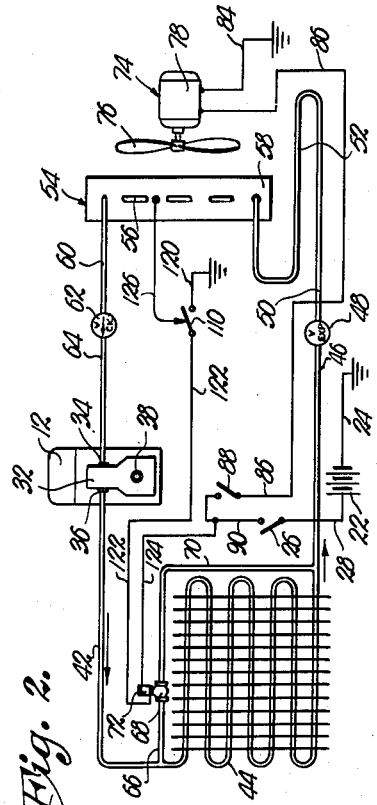
INVENTOR.
Robert V. Anderson
BY
ATTORNEY.

April 24, 1956 R. V. ANDERSON 2,742,765
AIR CONDITIONING SYSTEM FOR AUTOMOBILES
Filed Sept. 30, 1953 2 Sheets-Sheet 2

INVENTOR.
Robert V. Anderson
BY
ATTORNEY.

United States Patent Office 2,742,765
Patented Apr. 24, 1956

2,742,765

AIR CONDITIONING SYSTEM FOR AUTOMOBILES

Robert V. Anderson, Oklahoma City, Okla.

Application September 30, 1953, Serial No. 383,178

6 Claims. (Cl. 62—3)

This invention relates, generally to the field of air conditioning and, more particularly to an improved air conditioning system for automobiles.

The cooling of air for use in air conditioning an automobile involves many problems not generally encountered in other refrigerating applications. One of such considerations is that the compressor necessarily forming a part of the cooling system, if it is driven from a coupling with the automobile engine as is conventional, will be operated at different speeds which vary continuously with changes in speed of the engine. The alternative of providing a separate prime mover for driving the compressor at constant sped is both uneconomic and impractical in automobile cooling systems. Another special problem is that the evaporator and various other components of an air cooling system for an automobile are often required to operate under conditions of unusually high ambient temperature. Still another special factor to be considered is the effect upon the volume of cooled air which may be circulated by a blower directing a current of air through the evaporator or cooling coils when the latter is permitted to ice. Additional problems peculiar to automobile air conditioners include factors of economy, compactness, vibration, adaptability for installation and maintenance within automobile structures and the like.

Accordingly, it is the principal object of this invention to provide an improved air cooling system particularly adaptable for use in automobile air conditioning and in other mobile applications and refrigeration systems wherein the compressor is for some reason most conveniently driven by means which must normally operate the compressor continuously regardless of the temperature prevailing in the evaporator unit.

Another important object of this invention is to provide such an air cooling system that is especially adapted for use in applications where the compressor is most conveniently driven by means which normally operates the compressor at varying speeds from time to time determined by factors independent of the operating conditions of the air cooling system.

Still another important object of this invention is to provide an air cooling system that is especially adapted for use in conjunction with apparatus for heating an automobile and having parts in common therewith, such form of the invention including an improved type combination heater and evaporator coil assembly.

Other important objects of this invention include the provision of an improved air cooling system wherein a portion of the compressor capacity may be bypassed around the condenser, wherein such by-passing is automatically controlled in responsive to the temperature of the evaporator coils, wherein means is provided for automatically operating the system with predetermined operating parameters, particularly with respect to maintaining the temperature of the cooling coils within a preselected range such, for example, as to prevent icing of such coils, wherein an electrically reponsive valve is utilized to control such by-passing, and many other objects, including important details of construction, which will be made clear or become apparent as the following specification progresses.

Referring now to the accompanying drawings:

Figure 1 illustrates a manner of disposition of the non-electrical components of the system of this invention in an automobile, the latter being largely represented in general outline only;

Fig. 2 is a diagrammatic, flow chart type, representation of the system of this invention;

Fig. 3 is an enlarged, fragmentary view, partially in section, of a portion of the evaporator unit and the thermostatic control unit;

Figure 4:
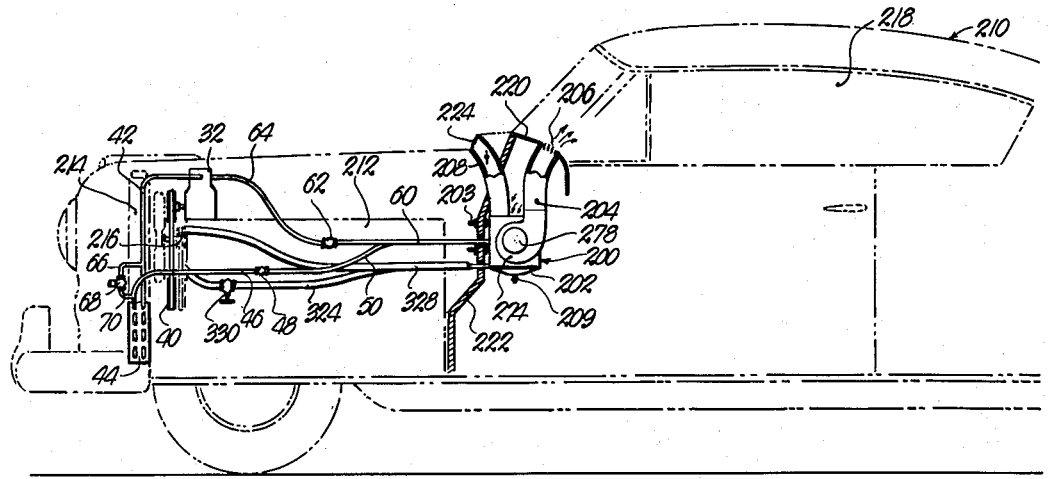
Figure 5:
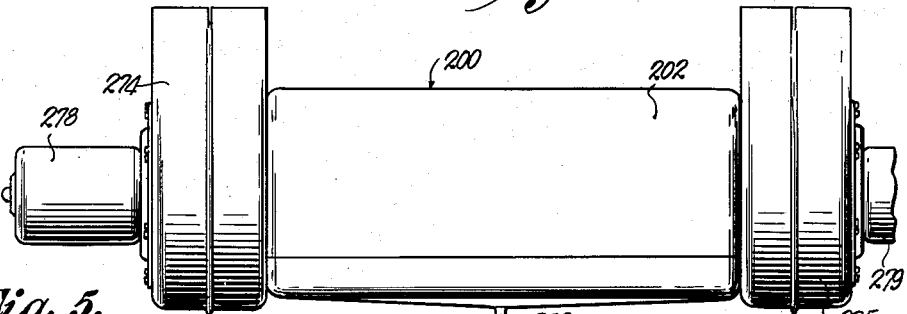
Figure 6:
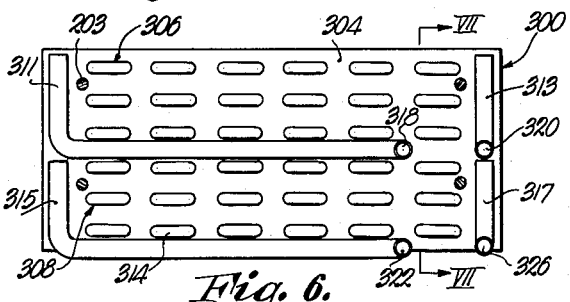
Figure 7:
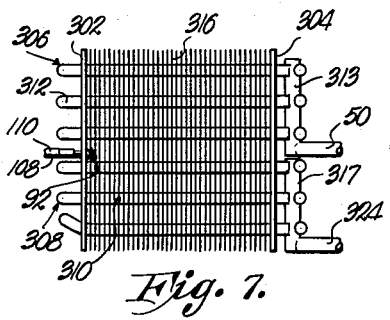

Fig. 4 illustrates a modified manner of disposition of the non-electrical components of the system of this invention in an automobile, wherein the blower and evaporator assembly are mounted on the fire wall of the automobile, the evaporator is of novel construction including parts for use in with the heating system of the automobile, and the condenser is mounted below the conventional radiator of the automobile;

Fig. 5 is a rear elevational view of the blower and evaporator housing shown in Fig. 4;

Fig. 6 is a front elevational view of the evaporator and heating coils per se with the housing removed, certain pipes being shown in section;

Fig. 7 is a cross-sectional view taken on line VII—VII of Fig. 6; and

Figure 8:
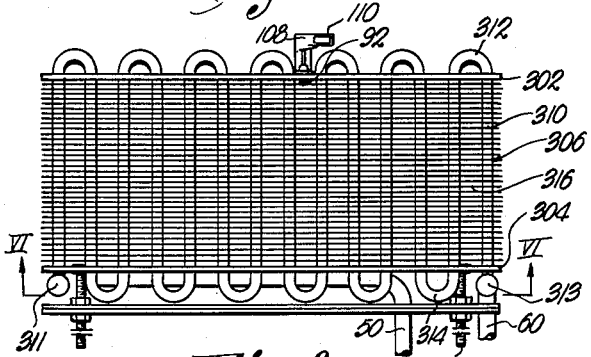

Fig. 8 is a top plan view of the evaporator and heating coils per se with the housing removed.

In the embodiment of the invention shown in Figs. 1, 2 and 3, the numeral 10 generally represents an automobile conventionally provided with an engine 12, a radiator 14, a trunk compartment indicated as at 16, an interior indicated as at 18 and a storage shelf 20 adjacent the rear of interior 18. Automobile 10 also is provided with the usual battery 22 having one terminal thereof grounded as at 24 and the other terminal thereof connected with an ignition switch 26 by a conductor 28.

The apparatus of this invention includes a fluid compressor 32 having an intake port 34, a discharge port 36 and a driving shaft 38. Compressor 32 may be mounted adjacent engine 12, preferably being fastened on top thereof, and shaft 38 of compressor 32 is operably coupled with engine 12 in such manner as to be driven by the latter in any suitable fashion such as by sheave and belt coupling means generally designated by the numeral 40 and effecting a coupling with engine 12 similar to that conventionally provided for the fan of the engine. It is significant to note that by virtue of the direct coupling between engine 12 and shaft 38 of compressor 32 effected by coupling means 40, the speed at which the compressor 32 is driven will be directly dependent upon the speed at which engine 12 is running and will vary therewith.

Discharge port 36 of compressor 32 is coupled by a fluid carrying line 42 with one end of a fluid condenser 44, condenser 44 being preferably mounted in automobile 10 directly in front of radiator 14 thereof. A replaceable, charged type of condenser such as described in my copending application Serial No. 268,042, now U. S. Letters Patent No. 2,691,279, may be used to advantage as condenser 44 of this invention, although, for the sake of simplicity of illustration of this invention, the showing of such construction is not herein repeated.

The opposite end of condenser 44 is coupled by a fluid carrying line 46 with an automatic expansion valve 48, the opposite side of valve 48 being coupled by a fluid carrying line 50, including a flash gas loop 52, with one end of an evaporator 54 having a number of cooling coils 56 held in spaced relationship by a number of transverse elements 58. It may be noted that a suitable type expansion valve 48 has been found to be the model No. 672, 2.1 ton automatic expansion valve manufactured by Detroit Controls Corporation of Detroit, Michigan. The opposite end of evaporator 54 from that coupled with flash gas loop 52 is coupled by a fluid carrying line 60 with a check valve 62, the other side of check valve 62 being coupled by fluid carrying line 64 to the intake port 34 of compressor 32. A quantity of refrigerant (not shown), such as Freon, is enclosed within the closed fluid system defined by compressor 32, line 42, condenser 44, line 46, valve 48, line 50, loop 52, coils 56, line 60, valve 62 and line 64.

A by-pass path around condenser 44 for the output of compressor 32 is provided by a fluid carrying line 66 coupled at one end with line 42 and at the opposite end with a solenoid operated valve 68, and a fluid carrying line 70 coupling the other side of valve 68 with line 46. Valve 68 is provided with an operating coil 72 which, when energized, opens valve 68 and, when de-energized, closes valve 68.

Evaporator 54 is preferably housed within the trunk compartment 16 of automobile 10, there being a blower 74 including air propelling means 76 driven by an electric motor 78 also disposed in compartment 16 relative to evaporator 54 for directing a stream of air through the latter and thence through suitable air stream conduit means 80 for discharge through a grill or opening 82 in shelf 20 into the interior 18 of automobile 10. One terminal of motor 78 is grounded as at 84 and the other terminal thereof is coupled through a conductor 86, a normally open power switch 88 and a conductor 90 with ignition switch 26 and accordingly battery 22 of the automobile 10. It is thus apparent that whenever ignition switch 26 and power switch 88 are closed, electrical current will pass from battery 22 through motor 78 to operate the air propelling fan 76 for directing a current of air through evaporator 54 into conduit 80 and thence to interior 18 of the automobile 10.

Control structure for coil 72 of solenoid operated valve 68 includes a temperature sensitive device broadly designated 92, which may be of the type available on the market and commonly referred to as "vernitherm elements." As illustrated, device 92 includes a body 94 having a cylindrical chamber 96 therein closed at its otherwise open end by a cap 98 and containing a quantity of material 100 having a high thermo coefficient of expansion and a reciprocable piston 102 to which is attached a rod 104 extending through body 94. Body 94 is externally threaded and is secured to a transverse element 58 of evaporator 54 by a holding nut 106, it being noted that chamber 96 and particularly expansible material 100 therein are located within evaporator 54 between and in proximity to adjacent coils 56 thereof. A bracket 108 is also attached in any suitable manner to an element 58 and supports a normally closed, single-pole, single-throw switch 110 having a swingable actuating arm 112. Bracket 108 also supports a swingable lever 114 which is pivoted as at 116 and biased by a spring 118 into engagement with the end of rod 104. The force of spring 118 normally retains piston 102 in tightly abutting relationship to material 100 by virtue of the leverage maintained on the end of rod 104 by the swingable lever 114.

When the temperature in evaporator 54 rises, material 100 expands, driving piston 102 in the direction of lever 114, the latter being thereby swung against the biasing force of spring 118 by the action of rod 104 pressing thereagainst. As will be seen in Fig. 3, the free end of lever 114 is so disposed as to engage the actuating arm 112 of switch 110 for opening the latter upon sufficient swinging of lever 114 and, accordingly, arm 112. It may be noted that switch 110 may conveniently be of the type commercially available under the trade name "Microswitch."

One terminal of switch 110 is grounded as at 120 and the other terminal thereof is coupled with one side of coil 72 by a conductor 122, the other side of coil 72 being coupled through a conductor 124, conductor 90, ignition switch 26, and conductor 28 with battery 22 of automobile 10. In Fig. 2, the mechanical linkage between device 92 and switch 110 is represented by the arrowed line 126. It will now be apparent that when the temperature in evaporator 54 rises to a predetermined level corresponding to a setting made on device 92, piston 102 will swing lever 114 to contact and move arm 112 thereby opening switch 110 to de-energize coil 72. When coil 72 is de-energized, valve 68 will be closed and the full output of compressor 32 will be directed through the closed system including condenser 44, expansion valve 48, flash loop 52, evaporator 54 and check valve 62. The system will then operate until the predetermined level of temperature in evaporator 54 has been reached, whereupon material 100 will have contracted sufficiently to permit the swinging of lever 114 by spring 118 to a position allowing arm 112 to swing to its open position, returning switch 110 to its normally closed condition and completing the energizing circuit for coil 72. Thereupon, as coil 72 is energized, valve 68 will be opened and a portion of the output of compressor 32 will be diverted from discharge port 36 thereof and line 42 through line 66, valve 68 and line 70 around condenser 44 to line 46. Under such conditions the full output of compressor 32 will obviously not be passed through condenser 44. This results in warm gas from compressor 32 being passed directly to evaporator 54 for preventing further cooling of coils 56 of evaporator 54 to lower the temperature of the latter below the predetermined desired level.

Since it is necessary that a stream of air from blower 74 pass through evaporator 54 between coils 56 and elements 58 thereof, in order to accomplish cooling of interior 18 of automobile 10, it is important that ice not be permitted to form upon coils 56 and elements 58 as the volume of air which would be passed through evaporator 54 by blower 74 would thereby be substantially decreased. Accordingly, device 92 should normally be designed or adjusted for closing switch 110 whenever the temperature in evaporator 54 approaches approximately 32° F. and for then opening switch 110 when the temperature within evaporator 54 rises a few degrees above such freezing over point.

It is believed that the other principles of operation of the system hereinabove described will be obvious to those skilled in the art without further explanation. It may be noted, however, that the inclusion of the flash gas loop 52 is desirable in a cooling system intended for operation in an automobile 10 wherein high ambient temperatures are encountered, since it insures the return to liquid form of any refrigerant which may have "flashed" or changed to the gaseous state during its passage through expansion valve 48. This prevents the lower part of coils 56 of evaporator 54 from being filled with liquid refrigerant, thereby decreasing the efficiency of evaporator 54.

It will, therefore, now be appreciated that the form of this invention illustrated in Figs. 1, 2 and 3 above described provides an automatic control whereby the temperature of evaporator 54 can be maintained at a level best suited for air cooling purposes regardless of changes in the output of compressor 32 which normally result from changes in the speed at which the engine 12 is running during operation of the latter. Obviously, the preferred adjustment and capacity of compressor 32 are those that will just maintain evaporator 54 at the predetermined, desired temperature level when engine 12 is idling, the automatically controlled by-pass means of the invention then operating to prevent freezing-over of evaporator 54 when the output of compressor 32 is increased by increases in running speed of the engine 12.

It will, of course, be understood that trunk compartment 16 of automobile 10 will be provided with suitable means (not shown) for admitting air either from the atmosphere or from interior 18 for circulation or recirculation, as the case may be, by blower 74 through evaporator 54 and conduit 82, to interior 18. Also obvious is the fact that any suitable air filtering or purifying means (not shown, since it forms no part of this invention) may be used with the apparatus of this invention to provide complete air conditioning for automobile 10.

Referring now to Figs. 4 to 8 inclusive, there is shown a modified manner of mounting certain of the components of this invention in an automobile 210 of the kind having an engine 212, a radiator 214, a water pump 216 through which radiator 214 is coupled with engine 212 by means (not shown), an interior compartment 218, a dashboard 220 within compartment 218, a fire wall 222 between engine 212 and interior 218, and a ventilation opening 224 in the body of automobile 210.

The refrigerating and electrical control circuits of the cooling portion of the air conditioning system shown in Figs. 4 to 8 will be understood to be the same as those shown and having correspondingly numbered components in Figs. 1, 2 and 3, except as hereinafter noted.

In Fig. 4, condenser 44 is disposed under, rather than in front of, radiator 214, and may even be formed as an extension of the latter during manufacture of the automobile 210. The flash gas loop 52 of Figs. 1 and 2 is omitted from Fig. 4 for purposes of clarity of illustration, but may be included in the system of Fig. 4, if desired, and preferably is so included. Otherwise, the principal differences between the systems of Fig. 1 and Fig. 4 reside in the construction and mounting of the combined evaporator-heat radiator assembly of Fig. 4, which is generally designated by the numeral 200.

Assembly 200 includes a hollow, outer housing 202 mounted on the rear side of wall 222 by any suitable means 203. On each end of housing 202 are mounted centrifugal blowers 274 and 275 having electric driving motors 278 and 279 respectively coupled thereto, the intakes of blowers 274 and 275 being in communication with the interior of housing 202 and the discharge of each being coupled by an air pipe 204 with an opening 206 in dashboard 220. A portion of the top of housing 202 is placed in communication with vent 224 of automobile 210 by an air duct 208, and another portion of the top of housing 202 is preferably open or grilled to provide recirculation, housing 202 being otherwise closed except for a small drain hole 209.

Within housing 202 is contained a combination evaporator-heat radiator unit 300. Unit 300 includes a pair of spaced frame plates 302 and 304. Extending between frame plates 302 and 304 and supported thereby are a pair of sets of fluid carrying coils 306 and 308, each including several spaced series of loops 310 arranged in aligned, serpentine order and having their bights 312 disposed on that side of frame plate 302 opposite from plate 304 and their opposed bights 314 disposed on that side of plate 304 opposite from plate 302.

The ends of each set of serpentine loops 310 of each series of coils 306 terminate in common leader lines 311 and 313, and the ends of each series of loops 310 of coil 308 similarly terminate in leader lines 315 and 317.

Between plates 302 and 304 and parallel therewith are a plurality of heat exchanging, plate-like fin elements 316, each of which is in contacting engagement with each of coils 306 and 308. Cooling or evaporator coil 306 is provided with an intake port 318 communicating with common line 311, port 318 being coupled with expansion valve 48 by fluid carrying line 50, and a discharge port 320 communicating with common line 313, port 320 being coupled with check valve 62 by fluid carrying line 60. Similarly, heating coil 308 is provided with an intake port 322 communicating with common line 315, port 322 being coupled with hot water pump 216 by means of a line 324, and a discharge port 326 communicating with line 317, port 326 being coupled with the return for pump 216 and the hot water circulation system of automobile 210 by a fluid carrying line 328. It will be noted that a conventional shut-off valve 330 is provided in line 324 for closing off the supply of hot water to coil 308 during periods when it is not desired that the latter be heated.

As is clear in Figs. 7 and 8, the bracket 108 carrying valve control switch 110 and its associated structure is mounted on plate 302 of unit 300, as is temperature sensitive device 92. Such control structure is installed and operates in the same general manner as above described relative to the embodiment of the invention illustrated in Figs. 1, 2 and 3.

It will now be appreciated that the combination evaporator-heat radiator unit 300 makes possible the use of a single device as both the heat absorbing or evaporator component of the refrigerator system forming a part of the air conditioner for automobile 210 and also as the heat radiating component of an otherwise conventional hot water heating system which may be used alternately with the cooling system in air conditioning automobile 210. It will be further observed that, by virtue of the improved construction of the unit 300 of this invention, the heat exchanging fins 316, which are common to coils 306 and 308, are utilized both when coil 306 is refrigerated for cooling purposes and when coil 308 is heated for warming automobile 210. Since each of coils 306 and 308 may thus utilize the entire heat exchanging surfaces of fin elements 316, it is clear that increased efficiency will result both when cooling and when heating automobile 210.

It will, of course, be clear that certain modifications and changes could be made in the structure described for purposes of illustration without departing from the principles and intent of this invention. Accordingly, it is desired to be limited only by the spirit of the invention as defined by the scope of the appended claims.

Having thus described the invention, what is claimed as new and desired to be secured by Letters Patent is:

1. In a refrigeration system including a single continuously operating compressor having intake and discharge ports, a single condenser, a single evaporator, first conduit means coupling the discharge port of the compressor with one side of the condenser, second conduit means coupling the other side of the condenser with one side of the evaporator, and third conduit means coupling the other side of the evaporator with the intake port of the compressor, apparatus for maintaining the temperature of the evaporator within a predetermined range comprising a fluid-carrying, by-pass line coupled between said first and second conduit means in by-passing relationship to the condenser only; a valve coupled in series with the by-pass line and adapted for alternately opening and closing the latter as the valve is opened and closed; and means for automatically opening the valve, when the temperature of the evaporator descends to a predetermined level, and for automatically closing the valve, when the temperature of the evaporator rises to a predetermined value, said means including a temperature sensitive device so disposed as to be responsive to changes in the temperature of the evaporator, and valve operating structure operably coupled with the valve and with the device for operating the valve in response to sensings of changes in temperature of the evaporator made by the device.

2. In the invention as set forth in claim 1, wherein said valve operating structure is electrically responsive and is coupled in an electrical circuit including a source of electrical power for operating the structure, said device being operably coupled with the circuit for controlling the latter to operate the structure responsive to changes in temperature of the evaporator sensed by the device.

3. In the invention as set forth in claim 2, wherein said valve operating structure is a solenoid, said circuit includes a switch, and said device includes a thermally expansible element and movable parts disposed for alternately closing and opening the switch as the element expands and contracts with changes of temperature of the evaporator.

4. Air cooling apparatus for an automobile having an engine, a battery and an interior compartment, said apparatus comprising a single compressor operably coupled with said engine for operation when the latter is running, said compressor having an intake port and a discharge port; a single fluid condenser; first fluid-carrying means coupling said discharge port with one side of said condenser; a single fluid evaporator having a coil provided with a number of loops; second fluid-carrying means including an automatic expansion valve coupling the other side of said condenser with one end of said evaporator coil; third fluid-carrying means coupling the other end of said evaporator coil with said intake port; an air blower disposed to direct a current of air between the loops of said evaporator coil; means for directing said current of air after it has passed between said loops into said interior; a fluid-carrying, by-pass line coupled between said first and second fluid-carrying means in by-passing relationship to the condenser only; a valve coupled in series with the by-pass line and adapted for alternately opening and closing the latter as the valve is opened and closed; and means for automatically opening the valve, when the temperature of the evaporator descends to a predetermined level, and for automatically closing the valve, when the temperature of the evaporator rises to a predetermined value, said means including a temperature sensitive device so disposed as to be responsive to changes in the temperature of the evaporator, and valve operating structure operably coupled with the valve and with the device for operating the valve in response to sensings of changes in temperature of the evaporator made by the device.

5. In the invention as set forth in claim 4, wherein said valve operating structure is electrically responsive and is coupled in an electrical circuit including a source of electrical power for operating the structure, said device being operably coupled with the circuit for controlling the latter to operate the structure responsive to changes in temperature of the evaporator sensed by the device.

6. In the invention as set forth in claim 5, wherein said valve operating structure is a solenoid, said circuit includes a switch, and said device includes a thermally expansible element and movable parts disposed for alternately closing and opening the switch as the element expands and contracts with changes of temperature of the evaporator.

References Cited in the file of this patent

UNITED STATES PATENTS

| | | |
|---|---|---|
| 1,880,653 | Baars | Oct. 4, 1932 |
| 2,059,086 | Campbell | Oct. 27, 1936 |
| 2,065,873 | Ruff | Dec. 29, 1936 |
| 2,180,760 | Mayo | Nov. 21, 1939 |
| 2,181,851 | Schlumbohm | Nov. 28, 1939 |
| 2,188,975 | Herz | Feb. 6, 1940 |
| 2,286,961 | Hanson | June 16, 1942 |
| 2,311,622 | Alexander | Feb. 23, 1943 |
| 2,319,310 | Euwer | May 18, 1943 |
| 2,430,960 | Soling | Nov. 18, 1947 |
| 2,479,170 | Kuempel | Aug. 16, 1949 |
| 2,518,316 | Henney | Aug. 8, 1950 |
| 2,526,874 | Jones | Oct. 24, 1950 |
| 2,536,248 | Alexander | Jan. 2, 1951 |
| 2,548,324 | Smith | Apr. 10, 1951 |